United States Patent [19]

Kimura et al.

[11] Patent Number: 5,206,931
[45] Date of Patent: Apr. 27, 1993

[54] PICTURE FILE SYSTEM

[75] Inventors: Mari Kimura, Kishiwada; Misao Kato, Katano; Yoshinori Amano, Takatsuki; Yoshio Hirauchi, Osaka; Kunihiko Hontani, Settsu, all of Japan

[73] Assignee: Matsushita Electric Industrial Co., Ltd., Kadoma, Japan

[21] Appl. No.: 623,162

[22] Filed: Dec. 6, 1990

[30] Foreign Application Priority Data

Dec. 12, 1989 [JP] Japan .................................. 1-322125

[51] Int. Cl.⁵ .............................................. G06F 3/14
[52] U.S. Cl. .................................... 395/161; 395/155; 395/128; 340/731
[58] Field of Search ............... 395/133, 139, 128, 155, 395/159, 161; 340/731, 747, 750, 706

[56] References Cited

U.S. PATENT DOCUMENTS 4,209,832 6/1980 Gilham et al. ...................... 364/521
4,970,663 11/1990 Bedell et al. ....................... 364/521

FOREIGN PATENT DOCUMENTS 61-264448 11/1986 Japan .
2247597 4/1992 United Kingdom .

Primary Examiner—Gary V. Harkcom
Assistant Examiner—Phu K. Nguyen
Attorney, Agent, or Firm—Spencer, Frank & Schneider

[57] ABSTRACT

A picture file system including a recording medium having a picture zone and a reduced picture zone divided therein. In a picture recording mode, a full-size picture data is recorded in the picture zone and a reduced picture of a predetermined data size corresponding to the full-size picture is recorded at a predetermined address in the reduced picture zone. In a picture retrieval mode, a plurality of the reduced pictures of the predetermined data size recorded at their predetermined addresses in the reduced picture zone are sequentially reproduced and displayed at the same time.

5 Claims, 4 Drawing Sheets

FIG. 2
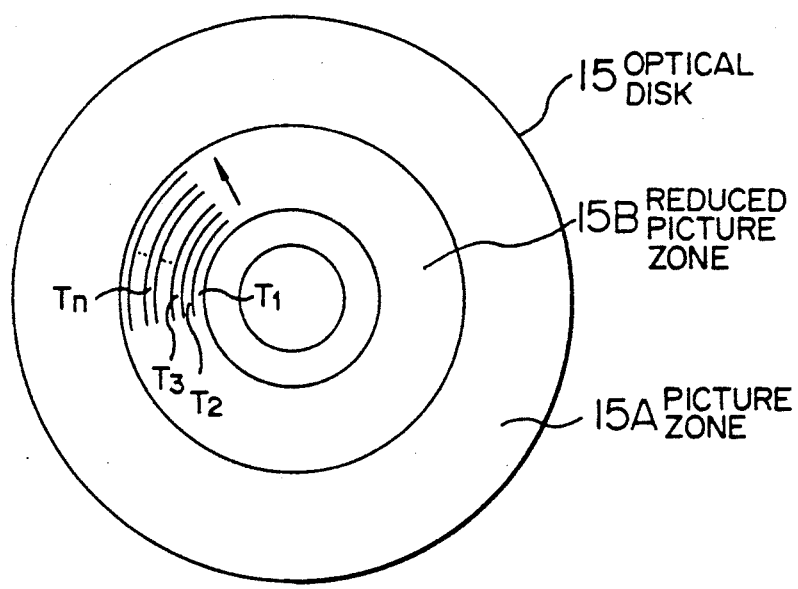
FIG. 3
| d₁ | d₂ | d₃ | d₄ | | | |
|---|---|---|---|---|---|---|
| PICTURE IDENTIFI-CATION NO. | PICTURE NAME | PICTURE ADDRESS | PICTURE PARAME-TER 1 | PICTURE PARAME-TER 2 | ----- | PICTURE PARAME-TER N |
FIG. 4
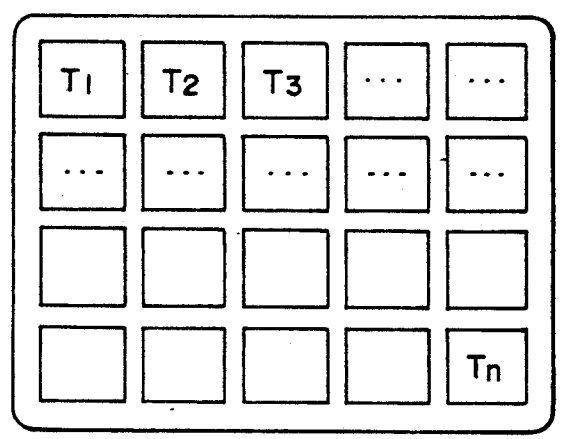

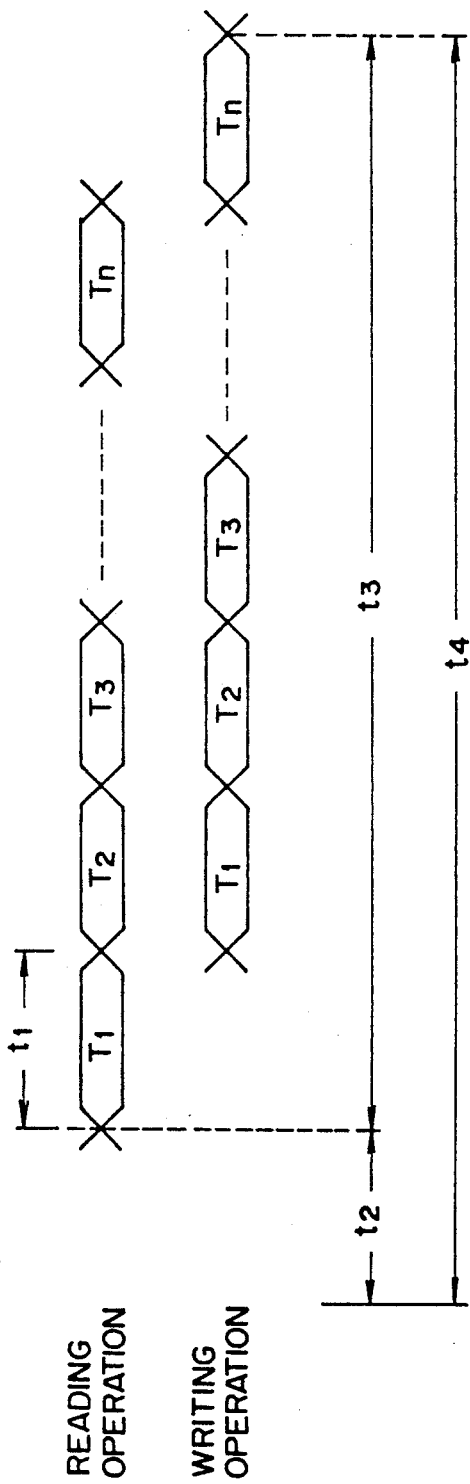

PICTURE FILE SYSTEM

BACKGROUND OF THE INVENTION

1. Field of the Invention

The present invention generally relates to a picture file system which records and reproduces a multiplicity of picture data.

2. Description of the Related Art

A large-capacity magnetic disk system and an optical disk system have been recently developed with the advancement of high-density recording techniques. The optical disk system, in particular, which has a large storage capacity, has enabled the filing (storage) of a large number of pictures, which has been so far impossible. When it is desired to retrieve a desired picture from a picture file system having a large quantity of picture data stored therein, the desired picture itself has been so far retrieved on the basis of the name or contents description applied to the desired picture. In this case, however, if a picture or pictures similar to the desired one are also filed in the picture file system, there is a high probability another and wrong picture will be read out. Meanwhile, when a person different from the file creator wishes to retrieve the file, it is difficult to grasp the correct contents of a desired picture on the basis of only the name and contents description of the picture and thus the retrieval disadvantageously becomes time-consuming. As a means for overcoming such disadvantage, there has been proposed a known picture file system wherein only characteristic parts are extracted from picture data to be recorded to obtain a reduced picture data, and the reduced picture and its original picture are previously stored at the picture storage time. At the retrieval time, a plurality of such reduced pictures are read out and displayed at the same time, retrieval being carried out on the basis of the displayed reduced pictures (refer to JP-A-61-264448). With such a picture file system, at the time of displaying a multiplicity of reduced pictures on a display screen for picture retrieval, reduced picture data having the same key word or a similar picture name and contents description are sequentially accessed and reproduced one after another and are written into a display frame memory. In this case, if the reduced picture data are scattered on a recording medium, it is necessary to previously manage the address data of each reduced picture data and the directory retrieval operation and the address retrieval operation of the recording medium are required for each reduced picture data, which results in the access time becoming large and thus the time needed to display a picture for retrieval becomes large. In particular, the access time of an optical disk, for example, having a diameter of 20 cm is as large as about 1 second, in which case, when a multiplicity of reduced pictures are to be displayed on a display screen at the same time for the purpose of improving the retrieval efficiency, the time necessary for the displaying of the multiplicity of reduced pictures becomes unfavorably large and the response performance of the picture file system is disadvantageously deteriorated.

SUMMARY OF THE INVENTION

It is an object of the present invention to provide a picture file system which can read out reduced picture data for retrieval at high speed, can provide quick display of a picture for retrieval and can improve its response performance.

In a picture file system in accordance with an aspect of the present invention, a picture data is input and recorded, the input picture data is subjected to a compression or reduction to obtain a reduced-picture data, the reduced-picture data having a predetermined unit size is stored at a predetermined address of a recording medium, the reduced-picture data stored at their predetermined addresses are sequentially reproduced to obtain a plurality of reproduced reduced-picture data in a picture retrieval mode, the plurality of reproduced reduced-picture data are displayed at the same time a, desired one of the reproduced reduced-pictures displayed is selected, and an original not-reduced picture corresponding to the selected reduced-picture is reproduced and displayed.

In the present invention, when the recording medium is a disk-shaped recording medium, the predetermined unit size of the reduced-picture data is an integer multiple of the data storage capacity of one of the tracks formed in the disk-shaped recording medium.

BRIEF DESCRIPTION OF THE DRAWINGS

FIG. 2 diagrammatically shows picture storage regions on an optical disk as an example of a recording medium in the picture file system of the present invention;

FIG. 3 shows an example of a picture directory data used in the picture file system of the present invention;

FIG. 4 shows an exemplary display array of retrieval reduced pictures in the present invention;

FIG. 6 is a timing chart for explaining the reproducing and displaying timing of retrieval reduced pictures.

DESCRIPTION OF THE PREFERRED EMBODIMENT

Figure 1:
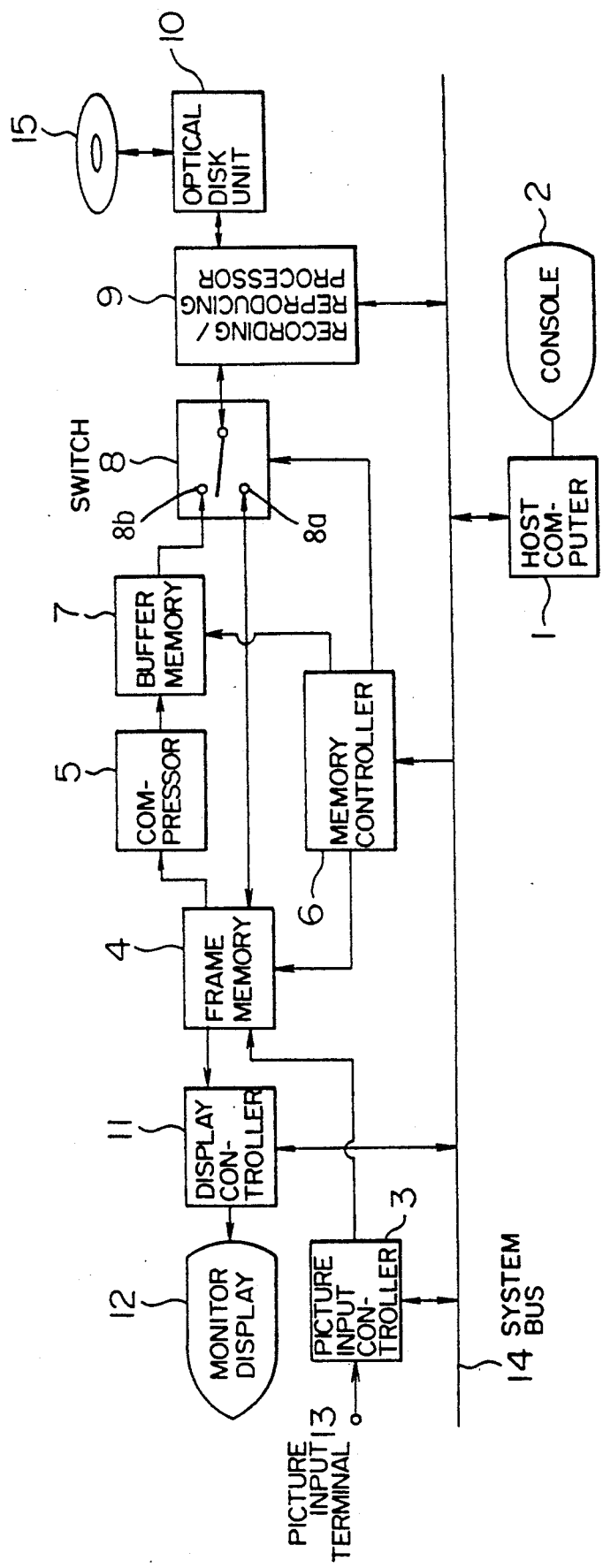
FIG. 1 is a block diagram showing an arrangement of a picture file system in accordance with an embodiment of the present invention.

Explanation will be made as to an embodiment of the present invention with reference to the attached drawings. Referring first to FIG. 1, there is shown a block diagram of an arrangement of a picture file system in accordance with an embodiment of the present invention. In the drawing, a host computer 1, when receiving such an instruction as picture recording or retrieval from a console 2, executes its internal program to control the operation of respective sections of the system through a system bus 14. A picture input controller 3 accepts a picture signal from such an external input apparatus as a video camera or a video tape recorder (VTR) through a picture input terminal 13, converts the accepted signal into a digital signal, and then sends the digital picture data to a frame memory 4 to be written therein. A display controller 11 is used to cause the contents of the frame memory 4 to be displayed on a monitor display 12. A compressor 5 receives a picture data from the frame memory 4, subjects the received picture data to a sub-sampling or extraction of only characteristic parts therefrom to compress the picture, and sends the compressed picture data to a buffer memory 7 to create a reduced picture data for retrieval therein. A switch 8, which performs change-over between the frame memory 4 and the buffer memory 7, is switched to its contact position 8a when it is desired to record a full-size picture and switched to the other contact position 8b when it is desired to record a reduced picture. A memory controller 6 performs address control over the writing and reading operation of the frame and buffer memories 4 and 7 and also performs switching control over the switch 8. A recording/reproducing processor 9 is provided to modulate or demodulate an input picture data in accordance with the recording format of an optical disk 15 and to perform data transfer between the processor 9 and an optical disk unit 10.

FIG. 2 diagrammatically shows a picture zone and reduced picture zones on an optical disk as a recording medium of a picture file used in the present embodiment of the invention. More specifically, the optical disk 15 is formed therein with a multiplicity of concentric or spiral tracks which addresses are sequentially given in the order from its inner or outer peripheral side to the other side. In the illustrated example, the track addresses are given sequentially in the direction shown by an arrow, i.e., from the inner peripheral side to the outer peripheral side. In FIG. 2, a picture zone 15a stores therein the full-size picture data entered in the frame memory 4, whereas a reduced picture zone 15b stores therein the retrieving picture data subjected at the compressor 5 to the reducing operation. Although the picture zone 15a is positioned at the outer peripheral side of the disk 15 and the reduced picture zone 15b is at the inner peripheral side in the present example, the zones may be positioned at the mutually opposite sides as necessary. Each reduced picture data, after being subjected at the compressor 5 to a reducing operation, has such a data size that it can be stored in one track of the optical disk 15. In a picture recording mode, these reduced picture data are sequentially stored in tracks having respective track addresses T1, T2, T3, ..., and Tn one after another in this track address order, i.e., in the present example, in the direction shown by the arrow sequentially from the inner peripheral side track to the outer one in FIG. 2.

Shown in FIG. 3 is an example of directory information of a picture data used in the present embodiment. This directory information is located in the same recording medium as the picture file or in an external memory other than the host computer 1. More specifically, the host computer 1 always manages such picture file directory information including a picture identification No. data d1 a picture name data d2, a picture address data d3 and a picture parameter data d4 as shown in FIG. 3. The picture identification No. data d1 is a code number which is applied to a picture data in a 1:1 relation therebetween to identify the picture data. For example, the recorded picture data are applied with their picture identification numbers of from 1 to N sequentially in their recorded order. In the illustrated example, the picture identification Nos. correspond to the track addresses of the reduced picture data in a 1:1 relation therebetween, and the reduced picture data having a picture identification No. of n is recorded at the track address Tn in the reduced picture zone 15b. Meanwhile, the picture name data d2 is the name applied to the picture data. The picture address data d3 corresponds to such a data as a track address indicative of the position of the picture data stored in the picture zone 15a of the optical disk 15. The picture parameter data d4 comprises parameters indicative of the attributes of the picture including the contents description, recorded data and size of the picture.

The operation of the embodiment of FIG. 1 will now be explained. First, in the data recording mode, a picture signal input from the picture input terminal 13 is converted at the picture input controller 3 into a digital signal and then sent to the frame memory 4. The picture data entered into the frame memory 4 is output to the monitor display 12 through the display controller 11, so that the operator can check whether or not the picture has been correctly entered. The memory controller 6, when receiving an instruction indicative of the recording of the input picture data from the host computer 1, causes the switch 8 to be switched to its connection side 8a, whereby the contents of the frame memory 4 is transferred to the recording/reproducing processor 9. The transferred picture data is modulated at the recording/reproducing processor 9 and then sent to the optical disk unit 10 to be recorded in the picture zone 15a of the optical disk 15. After all the contents of the frame memory 4 have been completely recorded, the memory controller 6 causes the switch 8 to be switched to its connection side 8b, so that the compressor 5 subjects the contents of the frame memory 4 to sub-sampling operations to compress the contents into such a data size that can be stored in one track of the optical disk 15, creates a reduced picture data, for retrieval and sends it to the buffer memory 7 to store the reduced picture data therein. Thereafter, the contents of the buffer memory 7 are transferred to the recording/reproducing processor 9, modulated therein, and further transferred therefrom to the optical disk unit 10 to be recorded in the reduced picture zone 15b of the optical disk 15. The picture data on the optical disk 15 are always controlled or managed by the host computer 1 in the form of such directory information as shown in FIG. 3. In the data recording mode, the host computer 1 receives the picture name data d2 and the picture parameter data d4 from the console 2 and increments the picture identification No. data d1 and the picture address data d3 to register new picture directory information. In the present embodiment, the picture identification No. is associated with the track address of the reduced picture data in a 1:1 relation and the reduced picture data for the picture data having a picture identification No. of, for example, n is stored at the track address Tn.

Explanation will next be made as to the retrieving operation.

The host computer 1, when receiving an instruction indicative of the retrieval mode from the console 2, causes the memory controller 6 to set the switch 8 at its connection side 8a, whereby the optical disk unit 10 is put in its reproduction mode, in which data stored at the n track addresses T1 to Tn in the reduced picture zone 15b of the optical disk 15 are continuously read out therefrom, demodulated at the recording/reproducing processor 9, and then written into the frame memory 4 as n reduced pictures. The contents of the frame memory 4 is displayed on the monitor display 12 under display controller 11. FIG. 4 is an example of the contents shown on the retrieval display screen. The reduced pictures stored at the track addresses T1, T2, ... , and Tn in FIG. 2 are displayed at such positions T, T2, ..., and Tn as shown in FIG. 4. That is, the n reduced pictures area are all read out at the same time and displayed simultaneously on one display screen. The memory controller 6 performs address control over the frame memory 4 so that the reduced pictures are displayed on the display screen as shown in FIG. 4. Then the operator gives a next retrieval instruction to the host computer 1 through the console 2, n reduced pictures data at n tracks starting from the track address T(n+1) are read out at the same time and similarly displayed on the next retrieval display screen. In this manner, every n reduced picture can be sequentially displayed and retrieved. Although an explanation has been provided in connection with the example where a retrieval start address Ts is set at the beginning track address T1 of the reduced picture zone 15a in the present embodiment, any track address in the reduced picture zone 15a may be set at the retrieval start address Ts to read out any continuous n reduced pictures from any track address and to create pictures for retrieval. For example, the host computer 1 is previously programmed so that the user wishing to retrieve pictures can designate the retrieval start address Ts with use of the console 2.

Further, the host computer 1 is previously programmed so that the picture identification No. data d1 are displayed simultaneously with the reduced pictures as associated therewith on the monitor display 12, and, so that, when the operator searches for a desired one of the retrieval pictures on the retrieval display screen and designates the corresponding picture identification No. d1 through the console 2, the host computer 1 makes reference to the picture directory information (refer to FIG. 3) of the corresponding picture, obtains the corresponding picture address d3 and reads out a data corresponding to one full-sized (not reduced) picture from the picture zone 15a of the optical disk 15. The memory controller 6 receives from the host computer 1 an instruction indicative of a full-size picture reproduction mode, and controls the switch 8 to be set at its connection position 8a to write a data transferred from the recording/reproducing processor 9 into the frame memory 4 as one full-size data corresponding to one picture. In this way, the desired full-size picture data can be displayed on the monitor display 12 under control of the display controller 11.

Figure 5:
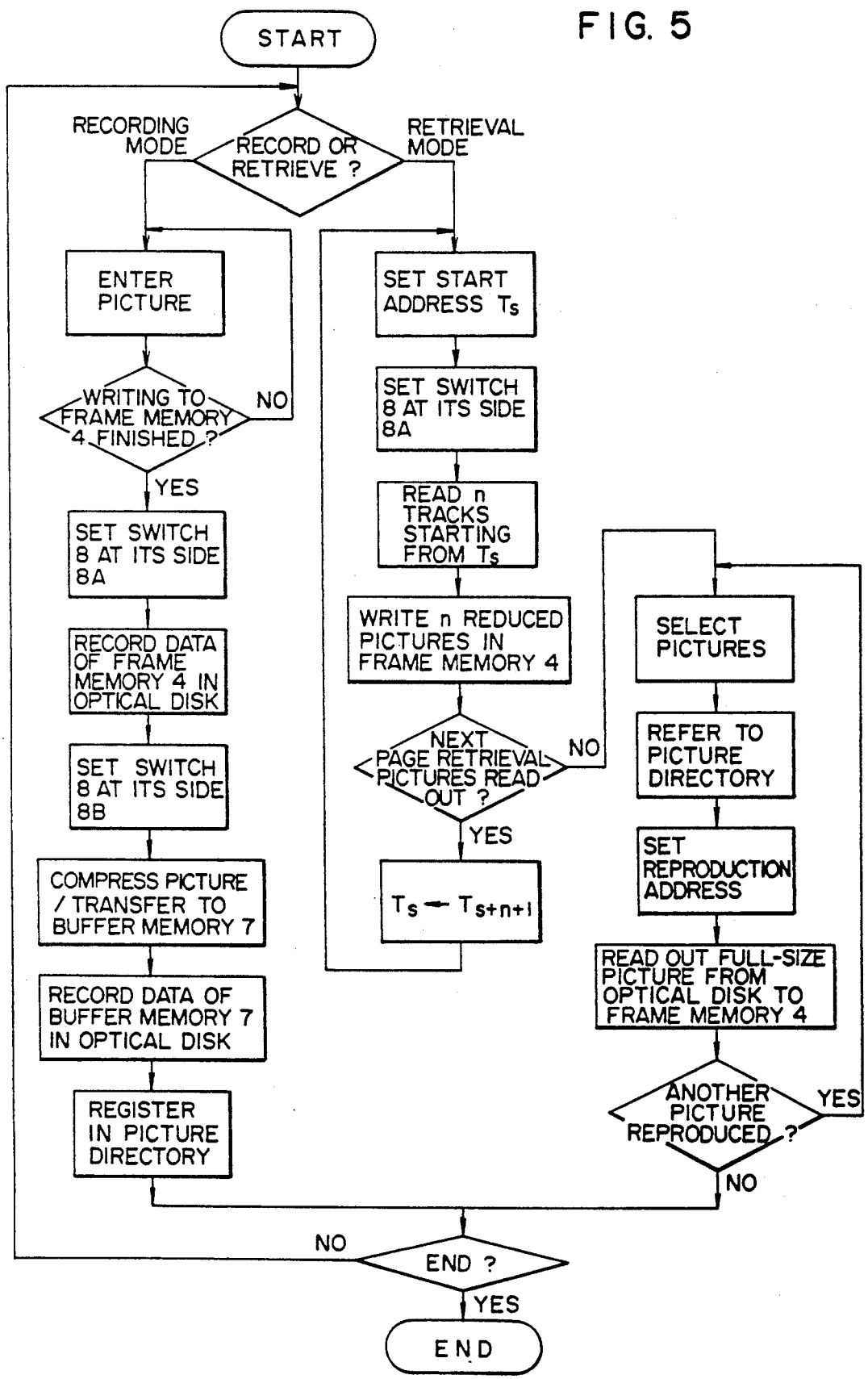
FIG. 5 is a flowchart showing the exemplary processing of the picture file system of the present invention.

The aforementioned processing flow of the embodiment of the picture file system is summarized as shown in FIG. 5.

FIG. 6 is an exemplary schematic timing chart for explaining the reading timing of reduced picture data and the writing timing thereof into the frame memory to create a retrieval display screen. In greater detail, one reduced picture data is read out in a time duration t1 corresponding to one turn (revolution) of the optical disk and the subsequent reduced picture data are sequentially read out without waiting for latency of disk rotation. The rotational speed of an optical disk is usually about 1800 rpm, in which case the time t1 corresponds to 1/30 of a second and the demodulating operation and the writing operation to the frame memory 4 such as address control of the frame memory can be carried out in this time duration and the data can be sequentially written into the frame memory 7 after the one-turn time delay t1. Thus, a retrieval-picture generation time t4 is the sum of the address retrieval time t2 necessary for retrieval of the track address of the initial reduced picture data and a total t3 of the reading and writing times, so that the retrieval pictures can be efficiently displayed.

The size of one reduced picture data is set to correspond to one track in the present example, but the data size may be set to correspond to an integer multiple of one track, which results in that sequential recording of the picture data can be attained and the retrieval pictures can be efficiently displayed without waiting for latency of the disk rotation.

As has been explained in the foregoing, in accordance with the present invention, there can be provided a picture file system which, in its picture retrieval mode, reduced picture data can be read out at a high speed and retrieval pictures can be quickly displayed with good response and good retrieval efficiency.

What is claimed is:

1. A picture file system comprising:
   means for receiving and storing picture data;
   means for compressing said stored picture data to obtain reduced-picture data;
   recording medium means for storing therein said reduced-picture data at a predetermined address thereof, said reduced-picture data having a predetermined unit size;
   means for sequentially reproducing said reduced-picture data stored at said predetermined address to obtain a plurality of reproduced reduced-picture data in a picture retrieval mode;
   means for simultaneously displaying said plurality of reproduced reduced-picture data;
   means for selecting one of said displayed reproduced reduced-pictures; and
   means for reproducing and displaying an original not-reduced picture corresponding to said selected reduced-picture.

2. A picture file system as set forth in claim 1, wherein said recording medium means is a disk-shaped recording medium, and the predetermined unit size of said reduced-picture data is an integer multiple of the data storage capacity of one of a plurality of tracks formed in said disk-shaped recording medium.

3. A picture file system comprising:
   means for inputting picture information;
   means for recording the inputted picture information as digital data at a predetermined address of a first zone of a recording medium;
   means for compressing and reducing the digital data of said inputted picture information;
   means for recording the compressed/reduced digital data at a predetermined address of a second zone of the recording medium in a desired unit size;
   means for commanding a picture retrieval;
   means responsive to said command for sequentially reading out a plurality of reduced picture data which are recorded at an address continuous from the predetermined address of the second zone of the recording medium;
   means for sequentially writing the read out reduced picture data one by one to a rectangular zone indicated by a predetermined address of one frame memory;
   means for displaying a content of the frame memory to which the reduced picture data are written on a display as one screen;
   means for selecting a desired picture from the plurality of reduced pictures displayed on the same screen;
   means for reading out an original picture data corresponding to the selected reduced picture and recorded on the first zone of the recording medium; and
   means for writing the read out picture data in the frame memory to display on the display as one screen.

4. A picture file system according to claim 3 wherein said recording medium includes a disk shaped recording medium, and the unit size of said reduced picture has integer multiples of a capacity of one track of the disk-shaped recording medium.

5. A method of displaying picture data comprising the steps of:

inputting picture information;

recording the inputted picture information as digital data at a predetermined address of a first zone of a recording medium;

compressing and reducing the digital data of said inputted picture information;

recording the compressed/reduced digital data at a predetermined address of a second zone of the recording medium in a desired unit size;

commanding a picture retrieval;

sequentially reading out in response to said command a plurality of reduced picture data which are recorded at an address continuous from the predetermined address of the second zone of the recording medium;

sequentially writing the read out reduced picture data one by one to a rectangular zone indicated by a predetermined address of one frame memory;

displaying a content of the frame memory to which the reduced picture data are written on a display as one screen;

selecting a desired picture from the plurality of reduced pictures displayed on the same screen;

reading out an original picture data corresponding to the selected reduced picture and recorded on the first zone of the recording medium; and writing the read out picture data in the frame memory to display on the display as one screen.

* * * * *